(12) United States Patent
Honda

(10) Patent No.: US 7,814,241 B2
(45) Date of Patent: Oct. 12, 2010

(54) STORAGE SYSTEM WITH FREE PORTS WHERE LOGICAL CONNECTIONS VIA PHYSICAL PATHS CONNECTING FREE PORTS ARE CONTROLLED

(75) Inventor: Kiyoshi Honda, Yokohama (JP)

(73) Assignee: Hitachi Ltd., Tokyo (JP)

(*) Notice: Subject to any disclaimer, the term of this patent is extended or adjusted under 35 U.S.C. 154(b) by 199 days.

(21) Appl. No.: 11/588,335

(22) Filed: Oct. 27, 2006

(65) Prior Publication Data
US 2008/0126698 A1 May 29, 2008

(30) Foreign Application Priority Data
Sep. 13, 2006 (JP) ............... 2006-247558

(51) Int. Cl.
G06F 3/00 (2006.01)
G06F 5/00 (2006.01)
G06F 12/00 (2006.01)

(52) U.S. Cl. ................ 710/38; 711/54; 711/114
(58) Field of Classification Search .......... 710/38
See application file for complete search history.

(56) References Cited

U.S. PATENT DOCUMENTS

| | | | |
|---|---|---|---|
| 6,148,414 A | 11/2000 | Brown et al. | |
| 6,330,687 B1 | 12/2001 | Griffith | |
| 6,408,358 B1 | 6/2002 | Uchiyama et al. | |
| 6,571,355 B1* | 5/2003 | Linnell | 714/9 |
| 6,728,258 B1* | 4/2004 | Okada et al. | 370/463 |
| 6,775,230 B1* | 8/2004 | Watanabe et al. | 370/228 |
| 6,831,920 B1* | 12/2004 | Uchida | 370/399 |
| 6,915,389 B2 | 7/2005 | Fujimoto | |
| 7,000,070 B2 | 2/2006 | Moriwaki et al. | |
| 2001/0037401 A1* | 11/2001 | Soumiya et al. | 709/232 |
| 2003/0088735 A1 | 5/2003 | Busser et al. | |
| 2003/0182516 A1* | 9/2003 | Fujimoto | 711/148 |
| 2004/0103261 A1* | 5/2004 | Honda et al. | 711/202 |
| 2005/0025045 A1* | 2/2005 | Shimozono et al. | 370/225 |
| 2005/0033804 A1* | 2/2005 | Iwami et al. | 709/203 |
| 2005/0050256 A1* | 3/2005 | Maki et al. | 711/1 |
| 2005/0097243 A1* | 5/2005 | Yamashita et al. | 710/38 |
| 2005/0195736 A1* | 9/2005 | Matsuda | 370/216 |
| 2006/0294317 A1* | 12/2006 | Berke | 711/141 |

FOREIGN PATENT DOCUMENTS

| | | |
|---|---|---|
| JP | 2003-280824 | 3/2002 |
| JP | 2004-145497 | 10/2002 |

OTHER PUBLICATIONS

Extended European Search Report for 07251114.0-1244, dated Jan. 16, 2008.

* cited by examiner

*Primary Examiner*—Chun-Kuan Lee
*Assistant Examiner*—Brooke J Dews
(74) *Attorney, Agent, or Firm*—Foley & Lardner LLP

(57) ABSTRACT

A first free port present in a controller or a switch device is physically connected to a second free port present in a switch device (switch device in another storage device unit) other than the controller or switch device comprising the first free port. The possibility of logical connection via a physical path connecting the first free port and second free port is controlled.

6 Claims, 17 Drawing Sheets

FIG. 3

301 SW ROUTING TABLE

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | PG_A | ADD_I_00 | ACT |
| 1 | UPPER | INITIATOR | — | PG_B | ADD_I_01 | ACT |
| 2 | END DEV | TARGET | RG_A | PG_A | ADD_T_10 | ACT |
| 3 | END DEV | TARGET | RG_A | PG_A | ADD_T_11 | ACT |
| 4 | END DEV | TARGET | RG_A | PG_A | ADD_T_12 | ACT |
| 5 | END DEV | TARGET | RG_B | PG_B | ADD_T_13 | ACT |
| 6 | END DEV | TARGET | RG_B | PG_B | ADD_T_14 | ACT |
| 7 | END DEV | TARGET | RG_B | PG_B | ADD_T_15 | ACT |
| 8 | END DEV | TARGET | RG_C | PG_B | ADD_T_16 | ACT |
| 9 | END DEV | TARGET | RG_C | PG_B | ADD_T_17 | ACT |

FIG. 4

303 CTL ROUTING TABLE

| PHY ID | CONNECTION TYPE | DEVICE TYPE | RAID GROUP | PATH GROUP | DEVICE ADDRESS | STATUS |
|---|---|---|---|---|---|---|
| 0 | END DEV | TARGET | RG_A | PG_A | ADD_T_10 | ACT |
|   | END DEV | TARGET | RG_A | PG_A | ADD_T_11 | ACT |
|   | END DEV | TARGET | RG_A | PG_A | ADD_T_12 | ACT |
| 1 | END DEV | TARGET | RG_B | PG_B | ADD_T_13 | ACT |
|   | END DEV | TARGET | RG_B | PG_B | ADD_T_14 | ACT |
|   | END DEV | TARGET | RG_B | PG_B | ADD_T_15 | ACT |
|   | END DEV | TARGET | RG_C | PG_B | ADD_T_16 | ACT |
|   | END DEV | TARGET | RG_C | PG_B | ADD_T_17 | ACT |

FIG. 6

301 SW ROUTING TABLE

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | — | ADD_I_00 | INACT |
| 1 | UPPER | INITIATOR | — | PG_B | ADD_I_01 | ACT |
| 2 | END DEV | TARGET | RG_A | PG_B | ADD_T_10 | ACT |
| 3 | END DEV | TARGET | RG_A | PG_B | ADD_T_11 | ACT |
| 4 | END DEV | TARGET | RG_A | PG_B | ADD_T_12 | ACT |
| 5 | END DEV | TARGET | RG_B | PG_B | ADD_T_13 | ACT |
| 6 | END DEV | TARGET | RG_B | PG_B | ADD_T_14 | ACT |
| 7 | END DEV | TARGET | RG_B | PG_B | ADD_T_15 | ACT |
| 8 | END DEV | TARGET | RG_C | PG_B | ADD_T_16 | ACT |
| 9 | END DEV | TARGET | RG_C | PG_B | ADD_T_17 | ACT |

FIG. 7

303 CTL ROUTING TABLE

| PHY ID | CONNECTION TYPE | DEVICE TYPE | RAID GROUP | PATH GROUP | DEVICE ADDRESS | STATUS |
|---|---|---|---|---|---|---|
| 0 | — | — | — | — | — | INACT |
| 1 | END DEV | TARGET | RG_A | PG_B | ADD_T_10 | ACT |
| 1 | END DEV | TARGET | RG_A | PG_B | ADD_T_11 | ACT |
| 1 | END DEV | TARGET | RG_A | PG_B | ADD_T_12 | ACT |
| 1 | END DEV | TARGET | RG_B | PG_B | ADD_T_13 | ACT |
| 1 | END DEV | TARGET | RG_B | PG_B | ADD_T_14 | ACT |
| 1 | END DEV | TARGET | RG_B | PG_B | ADD_T_15 | ACT |
| 1 | END DEV | TARGET | RG_C | PG_B | ADD_T_16 | ACT |
| 1 | END DEV | TARGET | RG_C | PG_B | ADD_T_17 | ACT |

FIG. 11

301 SW ROUTING TABLE

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | PG_A | ADD_I_00 | ACT |
| 1 | UPPER | INITIATOR | — | PG_B | ADD_I_01 | ACT |
| 2 | END DEV | TARGET | RG_A | PG_A | ADD_T_10 | ACT |
| 3 | END DEV | TARGET | RG_A | PG_A | ADD_T_11 | ACT |
| 4 | END DEV | TARGET | RG_A | PG_A | ADD_T_12 | ACT |
| 5 | END DEV | TARGET | RG_B | PG_B | ADD_T_13 | ACT |
| 6 | END DEV | TARGET | RG_B | PG_B | ADD_T_14 | ACT |
| 7 | END DEV | TARGET | RG_B | PG_B | ADD_T_15 | ACT |
| 8 | END DEV | TARGET | RG_C | PG_A/B | ADD_T_16 | ACT |
| 9 | END DEV | TARGET | RG_C | PG_A/B | ADD_T_17 | ACT |

FIG. 12

301 SW ROUTING TABLE

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | PG_A | ADD_I_00 | ACT |
| 1 | UPPER | INITIATOR | — | PG_B | ADD_I_01 | ACT |
| 2 | END DEV | TARGET | RG_A | PG_A | ADD_T_10 | ACT |
| 3 | END DEV | TARGET | RG_A | PG_B | ADD_T_11 | ACT |
| 4 | END DEV | TARGET | RG_A | PG_A | ADD_T_12 | ACT |
| 5 | END DEV | TARGET | RG_B | PG_B | ADD_T_13 | ACT |
| 6 | END DEV | TARGET | RG_B | PG_A | ADD_T_14 | ACT |
| 7 | END DEV | TARGET | RG_B | PG_B | ADD_T_15 | ACT |
| 8 | END DEV | TARGET | RG_C | PG_A | ADD_T_16 | ACT |
| 9 | END DEV | TARGET | RG_C | PG_B | ADD_T_17 | ACT |

FIG. 13

303 CTL ROUTING TABLE

| PHY ID | CONNECTION TYPE | DEVICE TYPE | RAID GROUP | PATH GROUP | DEVICE ADDRESS | XFER DATA SIZE | STATUS |
|---|---|---|---|---|---|---|---|
| 0 | END DEV | TARGET | RG_A | PG_A | ADD_T_10 | 100 | ACT |
| 0 | END DEV | TARGET | RG_A | PG_A | ADD_T_11 | 150 | ACT |
| 0 | END DEV | TARGET | RG_A | PG_A | ADD_T_12 | 200 | ACT |
| 1 | END DEV | TARGET | RG_B | PG_B | ADD_T_13 | 350 | ACT |
| 1 | END DEV | TARGET | RG_B | PG_B | ADD_T_14 | 300 | ACT |
| 1 | END DEV | TARGET | RG_B | PG_B | ADD_T_15 | 250 | ACT |
| 1 | END DEV | TARGET | RG_C | PG_B | ADD_T_16 | 200 | ACT |
| 1 | END DEV | TARGET | RG_C | PG_B | ADD_T_17 | 250 | ACT |

FIG. 14

303 CTL ROUTING TABLE

| PHY ID | CONNECTION TYPE | DEVICE TYPE | RAID GROUP | PATH GROUP | DEVICE ADDRESS | XFER DATA SIZE | STATUS |
|---|---|---|---|---|---|---|---|
| 0 | END DEV | TARGET | RG_A | PG_A | ADD_T_10 | 100 | ACT |
| 0 | END DEV | TARGET | RG_A | PG_A | ADD_T_11 | 150 | ACT |
| 0 | END DEV | TARGET | RG_A | PG_A | ADD_T_12 | 200 | ACT |
| 0 | END DEV | TARGET | RG_C | PG_A | ADD_T_16 | 200 | ACT |
| 0 | END DEV | TARGET | RG_C | PG_A | ADD_T_17 | 250 | ACT |
| 1 | END DEV | TARGET | RG_B | PG_B | ADD_T_13 | 350 | ACT |
| 1 | END DEV | TARGET | RG_B | PG_B | ADD_T_14 | 300 | ACT |
| 1 | END DEV | TARGET | RG_B | PG_B | ADD_T_15 | 250 | ACT |

FIG. 15

301 SW ROUTING TABLE

| PHY ID | CONNECTION TYPE | DEVICE TYPE | RAID GROUP | PATH GROUP | DEVICE ADDRESS | XFER DATA SIZE | STATUS |
|---|---|---|---|---|---|---|---|
| 0 | UPPER | INITIATOR | — | PG_A | ADD_I_00 | 450 | ACT |
| 1 | UPPER | INITIATOR | — | PG_B | ADD_I_01 | 1350 | ACT |
| 2 | END DEV | TARGET | RG_A | PG_A | ADD_T_10 | 100 | ACT |
| 3 | END DEV | TARGET | RG_A | PG_A | ADD_T_11 | 150 | ACT |
| 4 | END DEV | TARGET | RG_A | PG_A | ADD_T_12 | 200 | ACT |
| 5 | END DEV | TARGET | RG_B | PG_B | ADD_T_13 | 350 | ACT |
| 6 | END DEV | TARGET | RG_B | PG_B | ADD_T_14 | 300 | ACT |
| 7 | END DEV | TARGET | RG_B | PG_B | ADD_T_15 | 250 | ACT |
| 8 | END DEV | TARGET | RG_C | PG_B | ADD_T_16 | 200 | ACT |
| 9 | END DEV | TARGET | RG_C | PG_B | ADD_T_17 | 250 | ACT |

FIG. 16

301 SW ROUTING TABLE

| PHY ID | CONNECTION TYPE | DEVICE TYPE | RAID GROUP | PATH GROUP | DEVICE ADDRESS | XFER DATA SIZE | STATUS |
|---|---|---|---|---|---|---|---|
| 0 | UPPER | INITIATOR | — | PG_A | ADD_I_00 | 450 | ACT |
| 1 | UPPER | INITIATOR | — | PG_B | ADD_I_01 | 1350 | ACT |
| 2 | END DEV | TARGET | RG_A | PG_A | ADD_T_10 | 100 | ACT |
| 3 | END DEV | TARGET | RG_A | PG_A | ADD_T_11 | 150 | ACT |
| 4 | END DEV | TARGET | RG_A | PG_A | ADD_T_12 | 200 | ACT |
| 5 | END DEV | TARGET | RG_B | PG_B | ADD_T_13 | 350 | ACT |
| 6 | END DEV | TARGET | RG_B | PG_B | ADD_T_14 | 300 | ACT |
| 7 | END DEV | TARGET | RG_B | PG_B | ADD_T_15 | 250 | ACT |
| 8 | END DEV | TARGET | RG_C | PG_A | ADD_T_16 | 200 | ACT |
| 9 | END DEV | TARGET | RG_C | PG_A | ADD_T_17 | 250 | ACT |

FIG. 19

301A SW ROUTING TABLE (TABLE IN SW 121A)

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | PG_A | ADD_I_00 | ACT |
| 1 | LOWER | SW | — | PG_A | — | ACT |
| 2 | END DEV | TARGET | RG_A | PG_A | ADD_T_10 | ACT |
| 3 | END DEV | TARGET | RG_A | PG_A | ADD_T_11 | ACT |
| 4 | END DEV | TARGET | RG_A | PG_A | ADD_T_12 | ACT |
| 5 | END DEV | TARGET | RG_A | PG_A | ADD_T_13 | ACT |
| 6 | END DEV | TARGET | RG_B | PG_A | ADD_T_14 | ACT |
| 7 | END DEV | TARGET | RG_B | PG_A | ADD_T_15 | ACT |
| 8 | END DEV | TARGET | RG_B | PG_A | ADD_T_16 | ACT |
| 9 | END DEV | TARGET | RG_B | PG_A | ADD_T_17 | ACT |

FIG. 20

301B SW ROUTING TABLE (TABLE IN SW 121B)

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | PG_B | ADD_I_01 | ACT |
| 1 | LOWER | SW | — | PG_B | — | INACT |
| 2 | END DEV | TARGET | RG_C | PG_B | ADD_T_20 | ACT |
| 3 | END DEV | TARGET | RG_C | PG_B | ADD_T_21 | ACT |
| 4 | END DEV | TARGET | RG_C | PG_B | ADD_T_22 | ACT |
| 5 | END DEV | TARGET | RG_C | PG_B | ADD_T_23 | ACT |
| 6 | END DEV | TARGET | RG_D | PG_B | ADD_T_24 | ACT |
| 7 | END DEV | TARGET | RG_D | PG_B | ADD_T_25 | ACT |
| 8 | END DEV | TARGET | RG_D | PG_B | ADD_T_26 | ACT |
| 9 | END DEV | TARGET | RG_D | PG_B | ADD_T_27 | ACT |

FIG. 21

301C SW ROUTING TABLE (TABLE IN SW 121C)

| PHY ID | CONNECTION TYPE | DEVICE TYPE | RAID GROUP | PATH GROUP | DEVICE ADDRESS | STATUS |
|---|---|---|---|---|---|---|
| 0 | UPPER | SW | — | PG_A | — | ACT |
| 1 | UPPER | SW | — | PG_B | — | INACT |
| 2 | END DEV | TARGET | RG_E | PG_A | ADD_T_30 | ACT |
| 3 | END DEV | TARGET | RG_E | PG_A | ADD_T_31 | ACT |
| 4 | END DEV | TARGET | RG_E | PG_A | ADD_T_32 | ACT |
| 5 | END DEV | TARGET | RG_E | PG_A | ADD_T_33 | ACT |
| 6 | END DEV | TARGET | RG_F | PG_A | ADD_T_34 | ACT |
| 7 | END DEV | TARGET | RG_F | PG_A | ADD_T_35 | ACT |
| 8 | END DEV | TARGET | RG_F | PG_A | ADD_T_36 | ACT |
| 9 | END DEV | TARGET | RG_F | PG_A | ADD_T_37 | ACT |

FIG. 23

301B SW ROUTING TABLE (TABLE IN SW 121B)

| PHY ID | CONNECTION TYPE | DEVICE TYPE | RAID GROUP | PATH GROUP | DEVICE ADDRESS | STATUS |
|---|---|---|---|---|---|---|
| 0 | UPPER | INITIATOR | — | PG_B | ADD_I_00 | ACT |
| 1 | LOWER | SW | — | PG_B | — | ACT |
| 2 | END DEV | TARGET | RG_C | PG_B | ADD_T_20 | ACT |
| 3 | END DEV | TARGET | RG_C | PG_B | ADD_T_21 | ACT |
| 4 | END DEV | TARGET | RG_C | PG_B | ADD_T_22 | ACT |
| 5 | END DEV | TARGET | RG_C | PG_B | ADD_T_23 | ACT |
| 6 | END DEV | TARGET | RG_D | PG_B | ADD_T_24 | ACT |
| 7 | END DEV | TARGET | RG_D | PG_B | ADD_T_25 | ACT |
| 8 | END DEV | TARGET | RG_D | PG_B | ADD_T_26 | ACT |
| 9 | END DEV | TARGET | RG_D | PG_B | ADD_T_27 | ACT |

FIG. 24

301C SW ROUTING TABLE (TABLE IN SW 121C)

| PHY ID | CONNECTION TYPE | DEVICE TYPE | RAID GROUP | PATH GROUP | DEVICE ADDRESS | STATUS |
|---|---|---|---|---|---|---|
| 0 | UPPER | SW | — | PG_A | — | INACT |
| 1 | UPPER | SW | — | PG_B | — | ACT |
| 2 | END DEV | TARGET | RG_E | PG_A | ADD_T_30 | ACT |
| 3 | END DEV | TARGET | RG_E | PG_A | ADD_T_31 | ACT |
| 4 | END DEV | TARGET | RG_E | PG_A | ADD_T_32 | ACT |
| 5 | END DEV | TARGET | RG_E | PG_A | ADD_T_33 | ACT |
| 6 | END DEV | TARGET | RG_F | PG_A | ADD_T_34 | ACT |
| 7 | END DEV | TARGET | RG_F | PG_A | ADD_T_35 | ACT |
| 8 | END DEV | TARGET | RG_F | PG_A | ADD_T_36 | ACT |
| 9 | END DEV | TARGET | RG_F | PG_A | ADD_T_37 | ACT |

STORAGE SYSTEM WITH FREE PORTS WHERE LOGICAL CONNECTIONS VIA PHYSICAL PATHS CONNECTING FREE PORTS ARE CONTROLLED

CROSS-REFERENCE TO PRIOR APPLICATION

This application relates to and claims priority from Japanese Patent Application No. 2006-247558, filed on Sep. 13, 2006 the entire disclosure of which is incorporated herein by reference.

BACKGROUND

The present invention relates to a storage system comprising a plurality of storage devices.

A storage system comprises, for example, a plurality of storage devices, a controller for controlling the access from an upper-level device to each storage device, and switch devices introduced between the controller and a plurality of storage devices. Such storage system is disclosed in Japanese Patent Applications Laid-open No. 2004-145497 and 2003-280824. These applications disclose the connection between a plurality of controllers provided in a plurality of storage systems.

There are also types of storage systems in which, for example, the number of storage device units comprising switch devices and a plurality of storage devices can be increased or decreased. More specifically, in addition to a communication port (referred to hereinbelow as "upstream port") for connection to an upper-level device, the controller comprises a plurality of communication ports (referred to hereinbelow as "downstream ports") for connection to storage device units, and the switch device of the storage device unit comprises a plurality of communication ports (referred to hereinbelow as "switch ports"). A switch port of the switch device of the storage device unit is connected to at least one of a plurality of the downstream ports of the controller. The controller, storage device, or another switch device is connected to the switch port.

If physical connection is performed according to the predetermined rule (for example, SAS code (the rule of SAS (Serial Attached SCSI)) or FC code (the rule of FC (Fiber Channel))), there sometimes appear a communication port for which the physical connection is not required, that is, a free port. More specifically, the respective free ports are sometimes present in both the controller and the storage device unit and the respective free ports are sometimes present in two storage device units, but are not present in the controller.

It is desirable that the free ports be used effectively, but the technology therefor cannot be derived from the aforementioned Japanese Patent Applications Laid-open No. 2004-145497 and 2003-280824. This is because Japanese Patent Applications Laid-open No. 2004-145497 and 2003-280824 relate, as mentioned hereinabove, to a technology for mutually connecting a plurality of controllers provided in a plurality of storage systems and do not relate to connecting a controller and a storage device unit.

SUMMARY

Accordingly, an object of the present invention is to provide a novel technology for effectively employing free ports appearing when a controller and one or a plurality of storage device units are connected.

Other objects of the present invention will become clear from the following description.

A first free port present in a controller or a switch device is physically connected to a second free port located in a switch device (switch device located in another storage device unit) different from the controller or switch device comprising the first free port. Whether or not logical connection via a physical path joining the first free port and the second free port is possible is controlled in the storage system.

The expression "logical connection" as used herein, for example, means that the connection of a controller and a storage device is established, and the expression "logical connection is made possible" means that it is possible to establish such connection. More specifically, for example, in the case where logical connection is impossible even though a controller and a first storage device are physically connected via a switch device, the connection cannot be established between the controller and the first storage device, and in the case where the logical connection is possible, such connection can be established.

BRIEF DESCRIPTION OF THE DRAWINGS

FIG. 3 shows a configuration example of a SW Routing Table;

FIG. 4 shows a configuration example of a CTL Routing Table;

FIG. 6 shows the configuration of a SW Routing Table updated by the failure occurrence of FIG. 5;

FIG. 7 shows the configuration of a CTL Routing Table updated by the failure occurrence of FIG. 5;

FIG. 11 shows a SW Routing Table after updating that relates to a first example of load balancing;

FIG. 12 shows a SW Routing Table after updating that relates to a second example of load balancing;

FIG. 13 shows a CTL Routing Table before updating that relates to a third example of load balancing;

FIG. 14 shows a configuration of CTL Routing Table of FIG. 13 after updating;

FIG. 15 shows a SW Routing Table prior to updating that relates to a third example of load balancing;

FIG. 16 shows a configuration of SW Routing Table of FIG. 15 after updating;

FIG. 19 shows a configuration example of a SW Routing Table 301A of a switch device 121A;

FIG. 20 shows a configuration example of a SW Routing Table 301B of a switch device 121B;

FIG. 21 shows a configuration example of a SW Routing Table 301C of a switch device 121C;

FIG. 23 shows an example of the SW Routing Table 301B of FIG. 20 after updating;

FIG. 24 shows an example of the SW Routing Table 301C of FIG. 21 after updating;

DETAILED DESCRIPTION OF THE PREFERRED EMBODIMENTS

Figure 1:
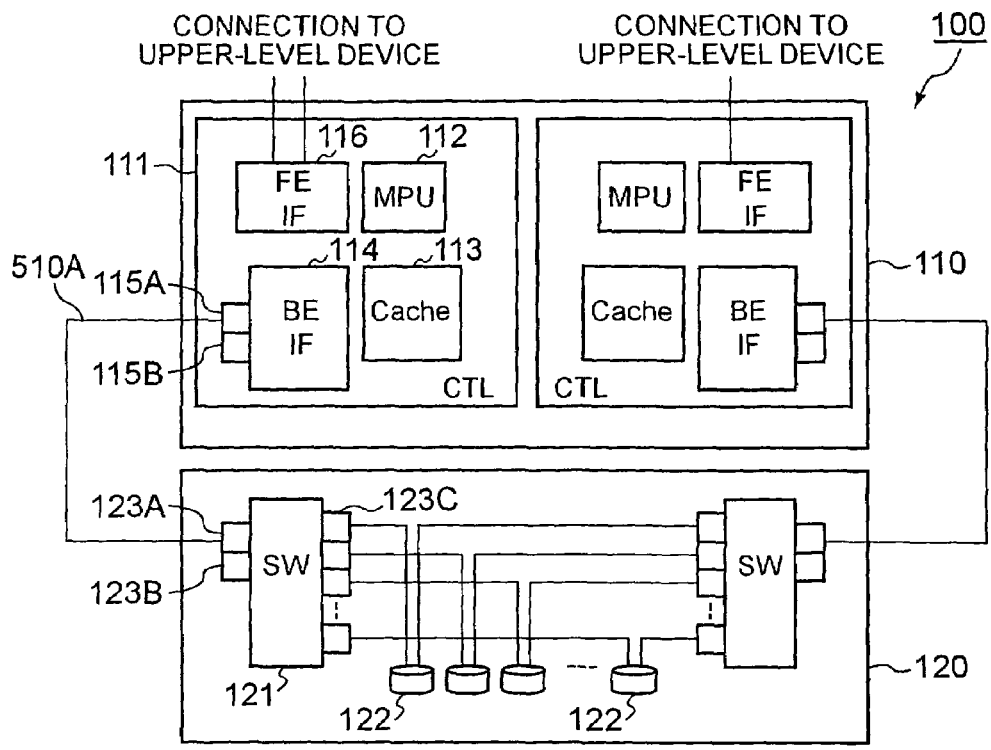
FIG. 1 shows a configuration example of a storage system of a small-scale configuration where a free port has appeared in the first embodiment of the present invention.

The embodiments of the present invention will be described below.

A controller and at least one storage device unit are connected according to the predetermined rule. For example, the SAS (Serial Attached SCSI) of fiber channel rule is the predetermined rule.

The controller is provided with communication ports of two types: an upstream port, which is a communication port for connection to an upper-level device, and a downstream port, which is a communication port for connection to a storage device unit. The controller is provided with at least two downstream ports. A lower-level device, more specifically, a storage device unit is connected to each downstream port, and the upper-level device (for example, a host computer or another storage system) is not connected thereto.

On the other hand, a switch device having a plurality of communication ports (referred to hereinbelow as "switch ports") and at least two storage devices for respective connection to at least two switch ports of the switch device are provided in the storage device unit. The switch device has a configuration in which a device of any type (controller, other switch device, storage device) may be connected to any switch port. A variety of storage devices such as hard disk drives and flash memory devices can be employed as the storage devices.

In the present embodiment, at least one storage device unit is physically connected in a cascade fashion (for example, in series or according to a tree structure) to the controller. Therefore, in the cascade configuration after the connection, the controller is at the upstreammost side, and the storage device unit is at the downstreammost side.

If a cascade connection is performed, a communication port appears (referred to hereinbelow as "free port") that remains unconnected physically to the controller or storage device unit. In other words, there is an extra communication port. More specifically, for example, in a storage system of a small-scale configuration, a first free port can appear in a controller, and a second free port can appear in a storage device unit. On the other hand, in a storage system of a large-scale configuration, a first free port can-appear in a first storage device unit at the downstreammost side of the cascade connection, and a second free port can appear in the second storage device unit at the downstreammost side.

In the present embodiment, the second free port is physically connected to the first free port. Furthermore, whether or not the logical connection via a physical path joining the first free port and second free port is possible is controlled by a routing table configuration. The routing table is a table for controlling through which communication port and where the access is made. In the present embodiment, the routing tables are prepared for both the controller and the switch device. In the explanation below, the routing table prepared for the controller will be termed "CTL Routing Table", and the routing table prepared for the switch device will be termed "SW Routing Table".

The configuration in which the number of storage device units is less than the number of downstream ports will be hereinbelow termed "small-scale configuration". On the other hand, the configuration where the number of storage device units is equal to or exceeds that of the downstream ports will be termed "large-scale configuration". The case where the storage system is of a small-scale configuration will be described below in greater detail as the first embodiment, and the case where the storage system is of a large-scale configuration will be explained as the second embodiment. In the explanation below, the cascade connection will be considered to be performed according to a SAS code. Furthermore, in the present embodiment, when a term "upper level" or "lower level" is used with respect to a certain object, this term indicates that the object is at an upper level or at a lower level. The term "upper level" means a location at a more upstream side in a data write flow according to the cascade connection, and the term "lower level" means a location at a more downstream side in a data write flow according to the cascade connection. Therefore, for example, "an upstream port" provided in a controller is a communication port of the controller that can communicate with an upper-level device. The "upper-level device" is a device present at a level higher than that of the controller, specific examples thereof being a computer or another storage system. On the other hand, "a downstream port" provided in a controller is a communication port that can communicate with a device present at a level lower than that of the controller. A switch device is an example of the device present at a level lower than that of the controller.

Embodiment 1

In the first embodiment, the performance improvement of a storage system with a small-scale configuration can be realized. More specifically, in this storage system, the port connection management is performed based on a path group concept. More specifically, for example, a downstream port or switch port is allocated to each path group and, therefore, a storage device that can be logically connected to each downstream port is distinguished. In the first embodiment, logical connection means that the connection is established after a predetermined exchange between a SAS initiator device and a SAS target device.

The detailed explanation will be provided below with reference to the appended drawings. To facilitate explanation, in the below-described storage system of a small-scale configuration, the number of downstream ports provided in one controller will be assumed to be 2 and the number of storage device units will be assumed to be 1.

Figure 2:
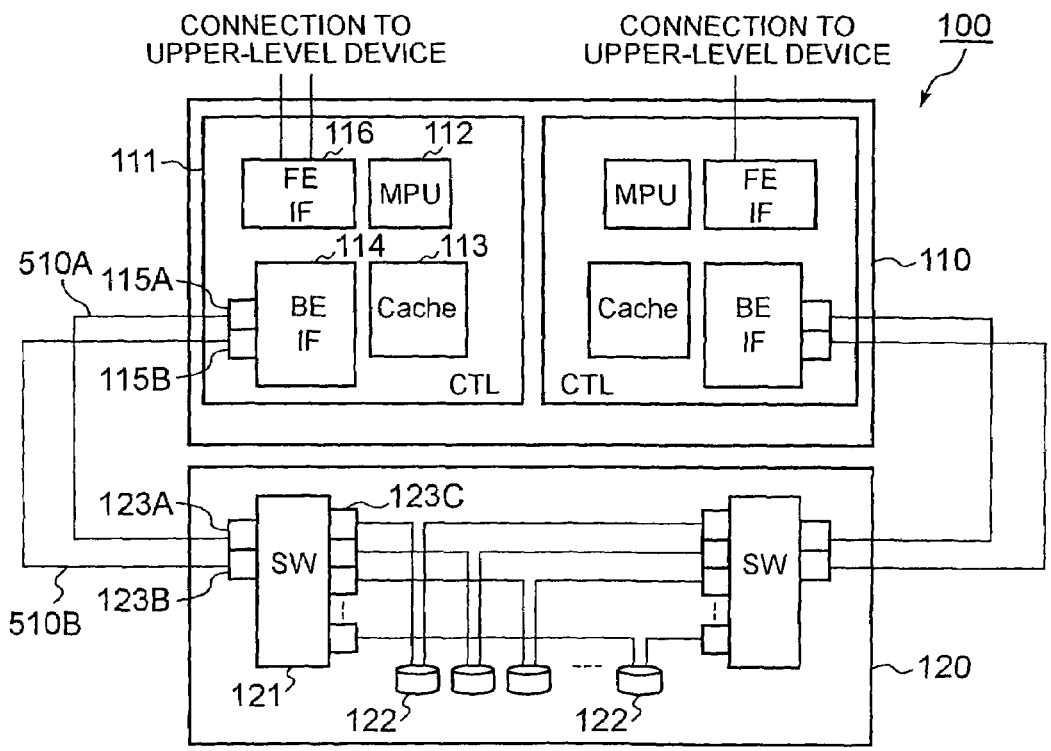
FIG. 2 shows a storage system of a small-scale configuration that is configured to employ effectively the free port.

FIG. 1 shows a configuration example of a storage system of a small-scale configuration where a free port has appeared in the first embodiment of the present invention. FIG. 2 shows a storage system of a small-scale configuration that is configured to employ effectively the free port. Identical elements will be assigned below with the same main reference numerals, and when identical elements are individually explained, the explanation is conducted by assigning additional letter codes to the main reference numerals.

A storage system 100 is configured by a cascade connection of one expansion housing 120 to a main housing 110. In the storage system 100, an access path from an upper-level device to a storage device 122 is duplicated. Only one access path will be mainly explained below.

A duplicated controller 111 (the degree of multiplication may be also higher than two) is present in the main housing 110. The controller 111 comprises, for example, a front end interface device (referred to hereinbelow as "FE IF") 116, a microprocessor unit (referred to hereinbelow as "MPU") 112, a cache memory 113, and a back end interface device (referred to hereinbelow as BE IF) 114. One or a plurality of storage devices may be carried in the base housing 110.

The FE IF 116 has a communication port (upstream port) (not shown in the figure) for connection to an upper-level device (for example, a host computer or another storage system). The FE IF 116 receives a first I/O request (write/read request) sent from the upper-level device.

The MPU 112 is a device comprising a microprocessor (MP) and controls the operation of the controller 111. For example, the MPU 112 receives the first I/O request received by the FE IF 116, specifies from the expansion housing 120 the storage device 122 that has to be accessed according to the first I/O request, and transmits a second I/O request to write or read data according to the first I/O request. The second I/O request is thereby transmitted to the specified storage device 122 via the switch device 121 and data writing or reading is performed.

The cache memory 113 temporarily stores the data written in the storage device 122 or data read from the storage device 122. When the first I/O request is a write request, the data that are the write object according to the write request are temporarily stored in the cache memory 113, and the stored data are sent to the storage device that is a transmission destination of the second I/O request. On the other hand, when the first I/O request is a read request, the data that are the read object according to the read request are read from the storage device that is the transmission destination of the second I/O request, the read data are temporarily stored in the cache memory 113, and the stored data are sent to the upper-level device.

The BE IF 114 comprises two communication ports (downstream ports) 115A and 115B (the number of the downstream ports is not limited to two and may be larger).

The expansion housing 120 is a type of a storage device unit. The expansion housing 120 comprises the switch device 121 that is a SAS expander and two or more storage devices 122. The switch device 121 has a plurality of switch ports 123. The controller 111 or switch device 122 is connected to each of a plurality of switch ports 123. The switch port 123 to which the storage device 122 is connected will be assigned with C as an additional letter code and will be termed "switch port 123C". On the other hand, the switch ports 123 to which the storage device 122 is not connected will be explained by assigning other additional letter codes.

When the controller 111 and expansion housing 120 are cascade connected according to the SAS code, as shown in FIG. 1, the downstream port 115A of the controller 111 and the switch port 123A of the switch device 121 are connected by a physical path (for example, a cable) 510A. With such configuration, normal operation of the storage system 100 can be ensured. However, with such configuration, as shown in FIG. 1, the downstream port 115B of the controller 111 and the switch port 123B of the switch device 121 are free ports that are not physically connected. This is because in the small-scale configuration, the number of the expansion housings 120 is less than the number of downstream ports 115 of the controller 111.

In the first embodiment, as shown in FIG. 2, the downstream port 115B of the controller 111 and the switch port 123B of the switch device 121 are also connected by a physical path 510B. Hardware resources that have not been utilized to the fullest are thus used.

With such configuration alone, all the storage devices 122 present in the expansion housing 120 can be accessed via the downstream ports 123A, 123B that essentially have to be managed separately. Therefore, the control with the controller 111 can become difficult.

Accordingly, in the first embodiment, the performance improvement of the storage system 100 of small-scale configuration can be realized by further employing a configuration with a SW Routing Table (routing table prepared in the switch device 121) and CTL Routing Table (routing table prepared in the controller 111). These routing tables will be described below.

FIG. 3 shows a configuration example of a SW Routing Table.

A SW Routing Table 301 is used for hardware routing control in the switch device 121. This SW Routing Table 301 may be also used for software routing control. A PHY ID, a connection type, a device type, a RAID group ID, a path group ID, a device address, and a status are recorded for each switch port in the switch device 121 in the SW Routing Table 301.

The PHY ID is an identifier of each switch port in the switch device 121 comprising this SW Routing Table 301. The "PHY" is a term representing a communication port in the SAS code.

The connection type represents the type of connection. For example, an "Upper" value (in other words, a value meaning the connection with an upper level) is entered for the switch ports 123A and 123B connected to the controller 111, which is an upper-level device, and an "End Dev" value (in other words, a value meaning the connection to a device located inside the expansion housing) is entered for the switch port 123C connected to the storage device 122. In addition, for example, a "Lower" value (in other words, a value meaning the connection to a lower level) can be entered.

The device type represents the type of the connected device. For example, an "Initiator" value (in other words, a value meaning that a SAS initiator device has been connected) is entered for the switch ports 123A and 123B connected to the controller 111, and a "Target" value (in other words, a value meaning that a SAS target device has been connected) is entered for the switch port 123C connected to the storage device 122. In addition, for example, a "SW" value (in other words, a value meaning that another switch device has been connected) can be entered.

The RAID group ID is an identifier of a RAID group. The RAID group is a group configured of at least two storage devices according to a RAID (Redundant Array of Independent (or Inexpensive) Disks) rule. Those at least two storage devices may be present in one expanded housing 120, or may be shared with another expanded housing. The RAID groups corresponding to "RG_A" and "RG_B" will sometimes be termed hereinbelow as "RAID group A" and "RAID group B" to avoid redundant explanation. The same is true for path groups.

The path group ID is an identifier of a path group. The path group is a concept employed for logically distinguishing a plurality of storage devices 122 and may be replaced with a term "zone". In the first embodiment, the PHY ID of the downstream port 115A or 115B, the PHY ID of the switch port 123A or 123B, and the PHY ID of the switch port 123C are allocated to one path group. As a result, a physical path connecting the downstream port 115A or 115B and the switch port 123A or 123B, or a physical path connecting the switch port 123C and the storage device 122 is allocated to one path group. This is why the term "path group" is used. A path group of one type can be allocated to one upper-level physical path (in other words, one switch port 123A or 123B, or one downstream port 115A or 115B). The allocation of path group ID may be performed in RAID group units. In this case, a contribution can be made to the improvement of reliability because a RAID group that has not been allocated to a path group identical to the own path group cannot be accessed from the downstream port.

The device address is an address of the device that will be connected.

The status represents a status of a communication port (in other words, the status of connection to a device). More specifically, for example, an "Act" value means that logical connection-can be made via a switch port corresponding to this value (in other words, this value means enabling). An "Inact" value, which is not shown in the figure, means that logical connection cannot be made via a switch port corresponding to this value (in other words, this value means disabling). If the values of both the first status that is a status of the first port and the second status that is the status of the second port connected to the first port via a physical path 510 are "Act", it means a status in which logical connection can be made via the physical path 510. On the other hand, if at least one value of the first status value and second status value is "Inact", it means a status in which logical connection via the physical path 510 is impossible. Thus, by controlling the status values of both ports to be connected to the physical path 510, it is possible to control whether logical connection via the physical path 510 is possible. And "Act" is a short for Active, and "Inact" is a short for Inactive.

The switch device 121 (more specifically, for example, a switch device control unit such as a processor that is not shown in the figure) controls the information provided from the switch ports 123A, 123B based on the SW Routing Table 301. More specifically, information relating to the storage device 122 that is the connection destination of the switch port 123C to which the path group ID "PG_A" has been allocated is provided to the switch device 121 from the switch port 123A, but information relating to the storage device 122 that is the connection destination of the switch port 123C to which another path group ID "PG_B" has been allocated is not provided to the switch device. The same is true for the other switch port 123B. For this reason, the CTL Routing Table shown by way of an example in FIG. 4 is created.

FIG. 4 shows a configuration example of a CTL Routing Table.

The types of information items recorded in the CTL Routing Table 303 are identical, as shown in FIG. 4, to the types of information items recorded in the SW Routing Table 301.

In the present embodiment, there are two PHY ID because the number of downstream ports 115 is two. Information relating to a storage device (target) that can be recognized via the downstream port 115 corresponding to a PHY ID is associated with each PHY ID. In the example shown in the figure, three storage devices belonging to the RAID group A can be recognized from the downstream port 115 corresponding to the PHY ID "0". On the other hand, three storage devices belonging to the RAID group B and two storage devices belonging to the RAID group C can be recognized from the downstream port 115 corresponding to the PHY ID "1".

As described hereinabove, the controller 111 not only can recognize all the storage devices 122 from one downstream port 115A or 115B, but can also recognize only the storage device connected to the switch port 123C, to which the same path group ID has been allocated, from one downstream port 115A or 115B. In other words, in the first embodiment, the access routes from the controller 111 to a plurality of storage devices 122 are logically split.

Figure 5:
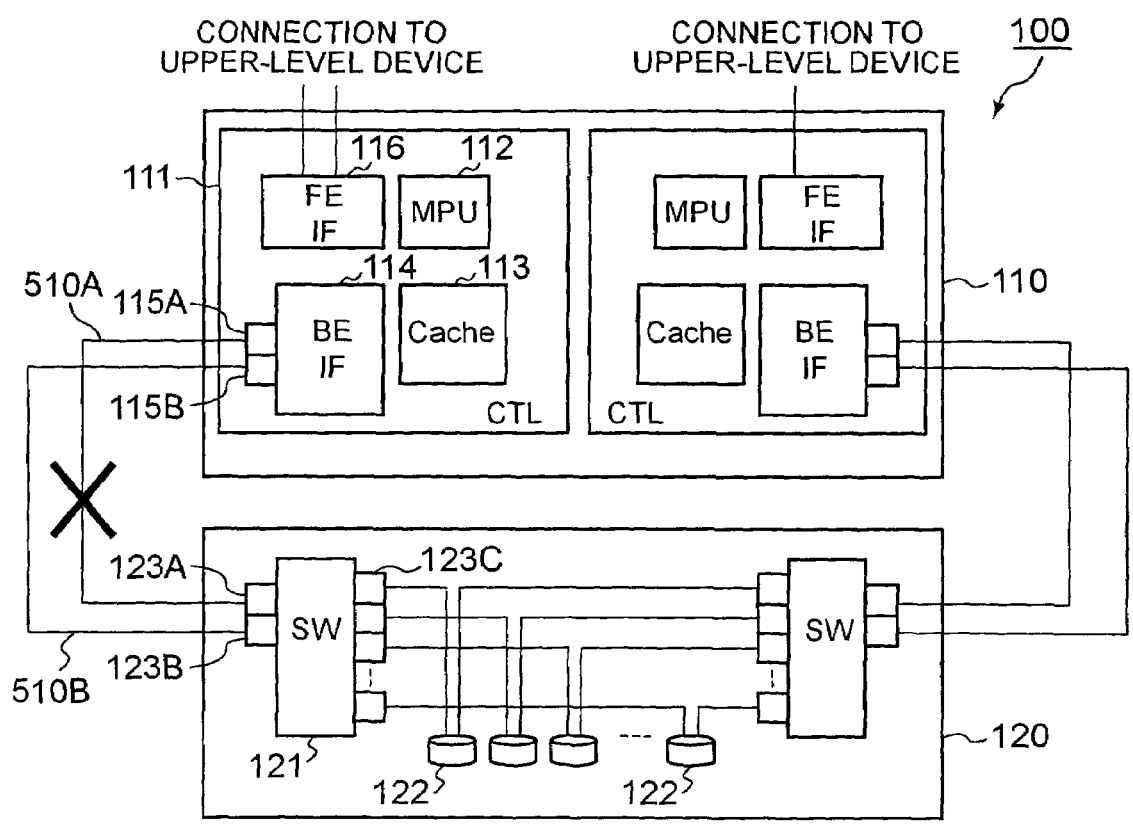
FIG. 5 illustrates the occurrence of a failure in one upper-level physical path in the storage system of a small-scale configuration shown in FIG. 2.

Further, in the first embodiment, as described hereinabove, the hardware resources are used by connecting the downstream port 115B with the switch port 123B by the physical path 510B, and the access routes from the controller 111 to a plurality of storage devices 122 are logically split based on the path group concept. However, if no appropriate measures are taken, when a failure (for example, disconnection) occurs in one physical path 510A, for example, as shown in FIG. 5, then logical connection will be impossible to a storage device to which logical connection has heretofore been possible via the physical path 510A.

Accordingly, in the first embodiment, an association modification unit is provided. The association modification unit cancels the association of two or more switch ports 123C corresponding to the path group A with which the physical path 510A has been associated when a failure occurred to this physical path 510A, and associates the path group B with which the failure-free physical path 510B has been associated, with the two or more switch ports 123C for which the association was canceled. The association modification unit may be provided, for example, in any of the controller 111, switch device 121, and management terminal 150. The association modification unit may be either hardware or a computer program. Alternatively, the association modification unit may execute some operations with hardware and the remaining operations with a computer program.

More specifically, for example, when a failure occurs in the physical path 510A, at least one of the controller 111 and switch device 121 can detect a failure with respect to the downstream port 115A or switch port 123A to which this physical path 510A has been connected. When such failure has occurred, the switch device 121, for example, updates the SW Routing Table 310 shown in FIG. 3 to the SW Routing Table 301 shown in FIG. 6. Thus, the switch device 121, as shown in FIG. 6, deletes the path group ID "PG_A" corresponding to the switch port 123A (PHY ID "0") and changes the status corresponding to the switch port 123A from "Act" to "Inact". Furthermore, the switch device 121 changes the path group ID "PG_A" associated with the PHY ID "2", "3", and "4" into "PG_B". On the other hand, the controller 111 updates the CTL Routing Table 303 shown in FIG. 4 to the CSL routing table 303 shown in FIG. 7. Thus, the controller 111 removes the information associated with the downstream port 115A (PHY ID "0") and changes the status corresponding to the downstream port 113A from "Act" to "Inact". Then, the controller 111 associates the removed information (information containing the path group ID "PG_A") anew with the PHY ID "1" by changing the path group ID to "PG_B".

As described hereinabove, in the first embodiment, when a failure occurs in the physical path 510A or 510B of the upper level, the allocation destinations of various ports allocated to a path group corresponding to the physical path 510A or 510B is changed into the path group corresponding to the physical path 510A or 510B where no failure has occurred. As a result, the operation of the storage system 100 can be continued without interruption, even when a failure occurs in the physical path 510A or 510B.

In the first embodiment, information can be set into the controller 111 or expansion housing 120.

Figure 8:
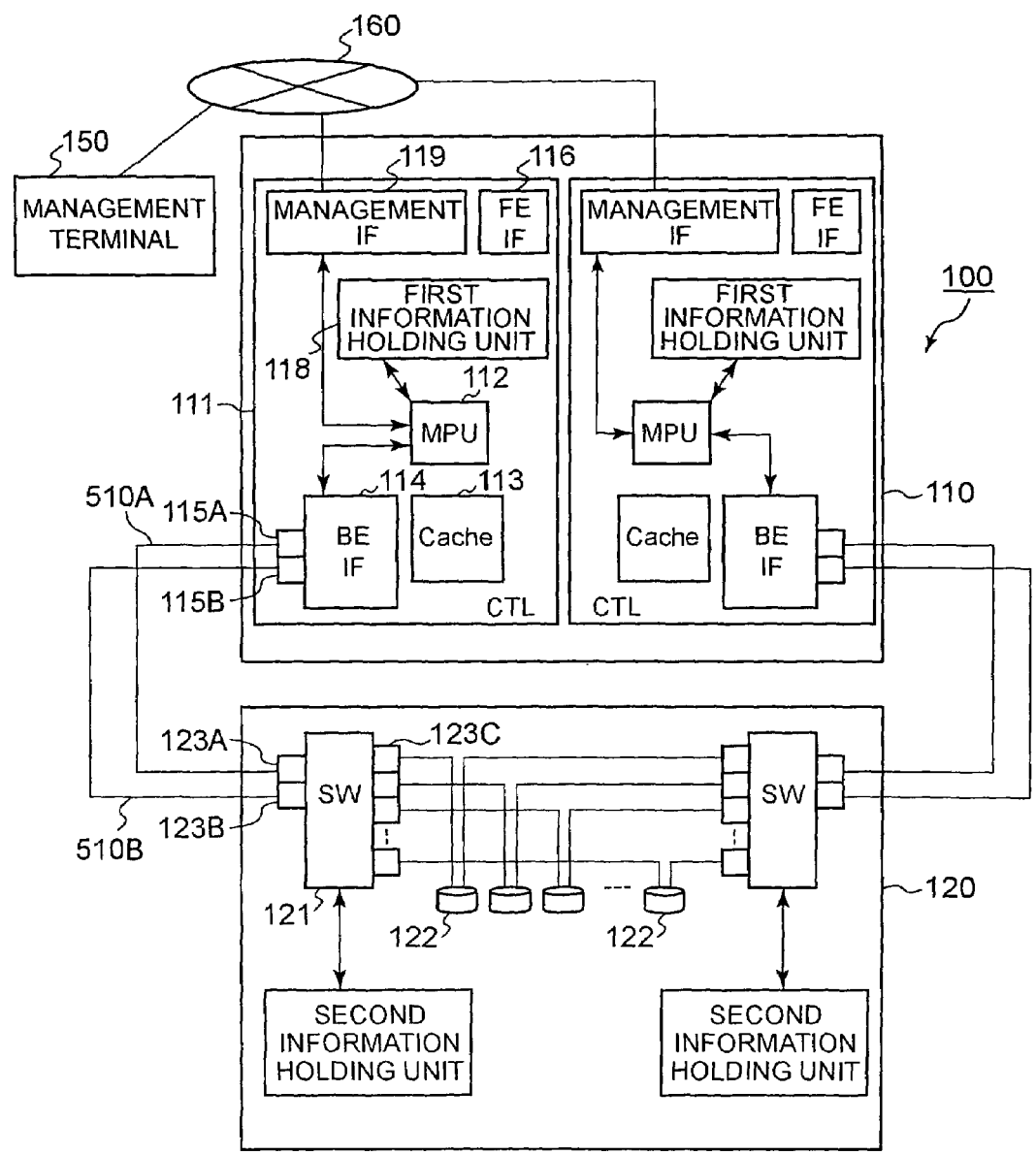
FIG. 8 shows an example of a mechanism for setting information into a controller 111 and an expansion housing 120.

FIG. 8 shows an example of a mechanism for setting information into the controller 111 or expansion housing 120.

This figure illustrates the mechanism for setting information in the so-called In-band. Thus, the management terminal 150 is present outside the storage system 100. The management terminal 150 is, for example, a computer having a CPU, a memory, a display device, or an input device.

The controller 111 is provided with a management IF 119 that is an interface device with the management terminal 150. The management terminal 150 and management IF 119 are connected via a communication network (for example, LAN (Local Area Network)) 160. The management terminal 150 sends control/management information for setting in the controller 111 and/or switch device 121. The control/management information is information for controlling and/or managing in the storage system 100. More specifically, the control/management information, for example, comprises information elements of the CTL Routing Table 303 or SW Routing Table 301.

A first information holding unit 118 is provided in the controller 111. The first information holding unit 118 is, for example, an area in the memory. The control/management information received by the management IF 119 from the management terminal 150 is stored in the first information holding unit 118. The control/management information stored in the first information holding unit 118 may be referred to from another controller (such configuration is not shown in the figure). Furthermore, in the first information holding unit 118, the SW Routing Tables of all the switch devices 121 may be managed together. In this case, for example, the controller 111 may periodically read the SW Routing Tables from all switch devices 121 and write the SW Routing Tables that were read out into the first information holding unit 118.

The entire control/management information stored in the first information holding unit 118 or part thereof is sent, for example, by the MPU 112 to the switch device 121 of the expansion housing 120 via the downstream port 115A or 115B. In the expansion housing 120, a second information holding unit 128 is provided so that it can access the switch device 121. The switch device 121 writes the control/management information that was received from the controller 111 into the second information holding unit 128. The second information holding unit 128 is, for example, a storage area on the memory.

For example, the controller 111 may update the CTL Routing Table 303 based on the control/management information stored in the first information holding unit 118. Furthermore, the controller 111 may also write the information for updating the SW Routing Table 301 together with updating the CTL Routing Table 303 (this information will be referred to hereinbelow as "first routing update information") into the second information holding unit 128. In this case, the switch device 121 may read the first routing update information from the second information holding unit 128 and update the SW Routing Table 301 based on the first routing update information that was read out.

Furthermore, for example, the switch device 121 may perform updating that was explained with reference, for example, to FIG. 6 and write the information for updating the CTL Routing Table 303 together with this updating (this information will be referred to hereinbelow as "second routing update information") in the second information holding unit 128. In this case, the controller 111 may read the second routing update information from the second information holding unit 128 and update the CTL Routing Table 303 based on the second routing update information that was read out.

Furthermore, the control/management information may be directly written from the management terminal 150 into the second information holding unit 128, rather than via the controller 111. In this case, the switch device 121 may read the control/management information from the second information holding unit 128 and update the SW Routing Table 301 based on the control/management information that was read out.

Furthermore, for example, the controller 111 may read the control/management information stored in the first information holding unit 118 at the predetermined timing, such as that when the power source of the expansion housing 120 is turned on, and write the information that was read out into the second information holding unit 128. Alternatively, the predetermined control/management information may be stored in the second information holding unit 128 before the expansion housing 120 is expanded, and as the power source of the expansion housing 120 is turned on when the expansion housing 120 is expanded, the switch device 121 of the expansion housing 120 may read out the control/management information that has been stored in advance in the second information holding unit 128 and create the SW Routing Table 301. With this method, because the controller 111 does not write the control/management information into the second information holding unit 128, the load on the controller 111 can be reduced.

Information setting into the controller 111 or switch device 121 can be also performed by another method. For example, a maintenance terminal may be mounted on the storage system 100 and the setting may be performed from the maintenance terminal.

In the first embodiment, there are provided a transfer data size monitoring unit for monitoring the size of data inputted into the storage device 122 and outputted therefrom for each storage device 122, and an association control unit for balancing a load by controlling the association between each downstream port 115 and each switch port 123 based on the monitoring results obtained with the transfer data size monitoring unit. At least one unit from the transfer data size monitoring unit and association control unit can be provided in at least one from among the controller 111, switch device 121, and management terminal 150. At least one unit from the transfer data size monitoring unit and association control unit may be either hardware or a computer program. Alternatively, part of the association control unit may be implemented as hardware and the rest as a computer program.

More specifically, the load balance can be realized, for example, by using a mechanism for information setting in the controller 111 or switch device 121 and updating the CTL Routing Table 303 or SW Routing Table 301. In order to balance the load, for example, the load of communication ports has to be monitored, and a load monitor, which is a device for performing such load monitoring, can be provided in the controller 111 or switch device 121, or in both devices. For example, the computer program executed by the management terminal 150 may collect information on load monitoring results from the controller 111 and/or switch device 121, compute how to perform load balancing by creating and modifying the CTL Routing Table 303 or SW Routing Table 301 based on the collected information, and transmit the information for setting the CTL Routing Table 303 or SW Routing Table 301 after the computed updating (for example, the updated tables 303, 301 themselves) to the controller 111 and/or switch device 121. Alternatively, the computation for load balancing may be performed by the controller 111, and the controller 111 may configure and modify the CTL Routing Table 303 or SW Routing Table 301. The case in which the controller 111 performs such processing will be described below in greater detail.

Figure 9:
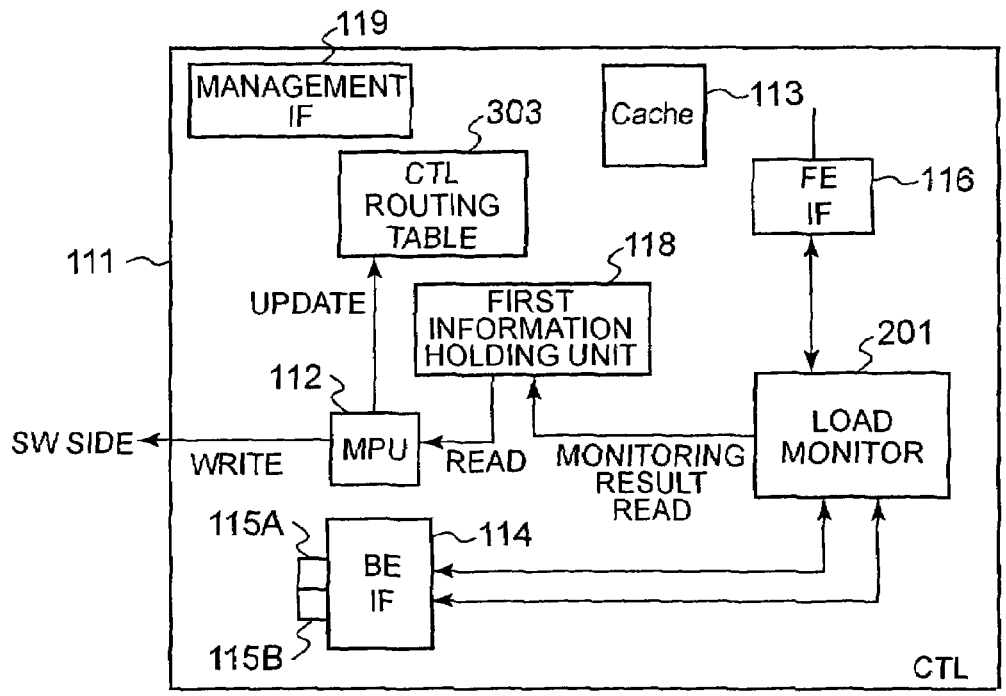
FIG. 9 shows a configuration example of the controller 111 carrying a load monitor.

FIG. 9 shows a configuration example of the controller 111 carrying a load monitor.

A load monitor 201 is inserted, for example, between the FE IF 116 and BE IF 114. The load monitor 201 may be configured as a LSI (Large Scale Integration) that controls data transfer between, for example, the FE IF 116, BE IF 114, MPU 112, and cache memory 113. The load monitor 201 can monitor, for example, the size (referred to hereinbelow as "transfer data size") of the transmitted and received data for each storage device (target device). The transfer data size may be represented by the number of bytes or by the number of transmitted and received frames.

The load monitor 201 can write the information representing the monitoring results (referred to hereinbelow as "monitoring result information") into a first information holding unit 118. The MPU 112 can read the monitoring result information from the first information holding unit 118 and perform load balancing based on the monitoring result information. Thus, the MPU 112 can update a CTL Routing Table 303 based on the monitoring result information and write the first routing information for updating a SW Routing Table 301 in combination with the aforementioned updating into a second information holding unit 128.

Figure 10:
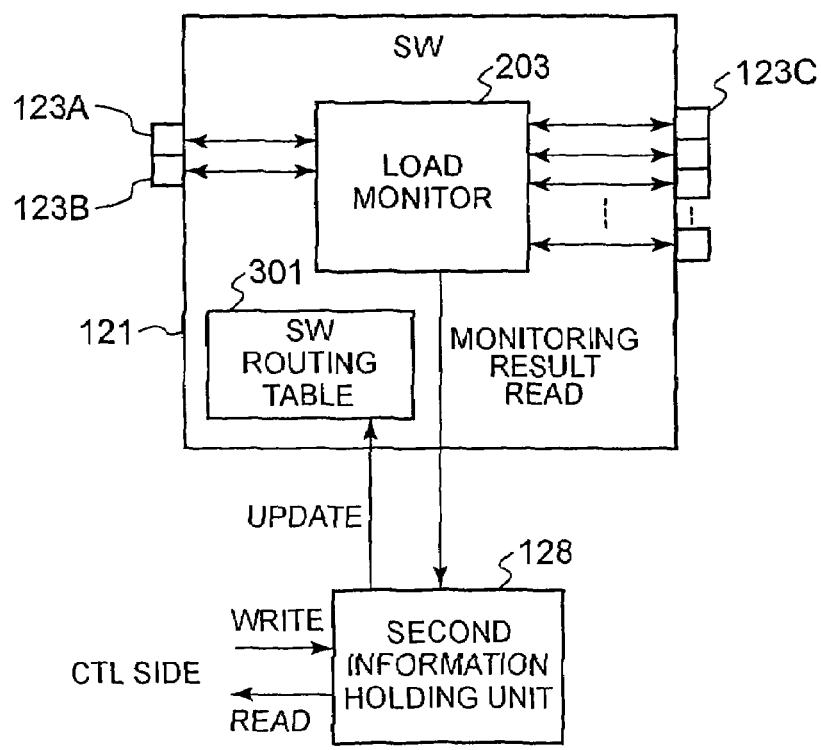
FIG. 10 shows a configuration example of a switch device 121 carrying a load monitor.

FIG. 10 is a configuration example of the switch device 121 carrying a load monitor.

A load monitor 203 monitors the load of each switch port. The load monitor 203 may be configured as a data transfer LSI for controlling data transfer between the switch ports.

The load monitor 203 can write the monitoring result information into a second information holding unit 128. The monitoring result information written into the second information holding unit 128 can be read by the controller 111. In other words, the controller 111 can collect the monitoring result information present in the switch device 121. Furthermore, based on the monitoring result information, the controller 111 can compute the adequate load balance and update the CTL Routing Table 303. The controller 111 can write the first routing control information matching this updating into the second information holding unit 128. The first routing control information written into the second information holding unit 128 can be read by a control unit (not shown in the figure) of the switch device 121, and the SW Routing Table 301 can be updated based on this first routing control information.

Several examples of load balance are described below.

FIG. 11 shows a SW Routing Table after updating that relates to a first example of load balance. The updated entries are shown by a bold line frame.

The controller 111 can compute the transfer data size for each RAID group. More specifically, for example, the controller 111 can compute a sum total (transfer data size of RAID group) of transfer data sizes detected for each storage device (target device) for each RAID group. Furthermore, for example, when the transfer data size of a RAID group C is larger than a certain threshold (or larger than those of other RAID groups A, B), a path group A is allocated in addition to a path group B to a switch port 123C to which the storage device 122 belonging to the RAID group C is connected. In other words, the controller 111 can be logically connected from any of the downstream ports 115A, 115B to the storage device 122 belonging to the RAID group C.

FIG. 12 shows a SW Routing Table after updating that relates to a second example of load balance. The updated entries are shown by a bold line frame.

The controller 111 uniformly allocates different path groups to each switch port 123. In other words, the number of switch ports allocated to each of a plurality of path groups is made the same, if possible. In this case, if possible, the same path groups may be allocated to a plurality of switch ports 123C to which a plurality of switch devices 122 belonging to the same RAID group are respectively connected, and the allocated path groups may be uniformly altered for a plurality of such switch ports 123C, as shown in FIG. 12.

FIG. 13 shows a CTL Routing Table prior to updating that relates to a third example of load balancing. FIG. 14 shows the configuration of the CTL Routing Table of FIG. 13 after updating. FIG. 15 shows a SW Routing Table prior to updating of the third example of load balancing. FIG. 16 shows the configuration of the SW Routing Table of FIG. 15 after updating. The updated entries are shown by a bold line frame.

A new information item (column), namely, a transfer data size (Xfer Data Size) is prepared in both the CTL Routing Table 303 and the SW Routing Table 301. The transfer data size is recorded in the entry corresponding to each storage device 122 based on the monitoring result information of the load monitor.

The controller 111 performs load balancing to equalize the respective transfer data sizes of a plurality of physical paths 510A and 510B. In other words, the controller 111 performs load balancing (equalizes the transfer data sizes) such that transfer data sizes of the downstream port 115A (PHY ID "0") and switch port 123A (PHY ID "0:") become equal to the respective data transfer sizes of the downstream port 115B (PHY ID "1") and switch port 123B (PHY ID "1"). In this embodiment, because different path group ID are allocated to physical paths, the controller 111 computes the sum total of transfer data sizes separately for parity group ID. The controller 111 then changes the allocation of path groups so that the transfer data sizes of the parity group ID become identical. More specifically, for example, the transfer data size of the downstream port 115A (PHY ID "0", path group A) is 450 and the transfer data size of the downstream port 115B (PHY ID "1", path group B) is 1350. Equalizing them, we obtain 900. Accordingly, the controller 111 changes the path group corresponding to the switch port connected to the storage device belonging to the RAID group C from the path group B to the path group A. As a result, only data of a transfer data size of 450 of the RAID group C are transferred from the downstream port 115B to the downstream port 115A, and the respective transfer data sizes are equalized and become 900.

The equalization is not always necessary. For example, it is also possible to set the ratio of transfer data sizes in advance for each path group and perform load balancing so that the transfer data sizes of a plurality of path groups that are obtained from the monitoring result information of the load monitor are at the predetermined ratio.

The first embodiment was explained above. In the first embodiment, for example, the management terminal 150 may read the Routing Tables 303, 301 from the first information holding unit 118 and/or second information holding unit 128 and display the Routing Tables 303, 301 on a display device (not shown in the figure).

Embodiment 2

In the above-described first embodiment, the performance improvement of the storage system of a small-scale configuration was realized, whereas in the second embodiment, the performance improvement of the storage system of a large-scale configuration can be realized. More specifically, by physically connecting a second free port present in a downstreammost second storage device unit of a cascade configuration to a first free port present in a downstreammost first storage device unit of the cascade configuration, a loop-like physical connection is possible. However, by setting the status values corresponding to mutually connected switch ports to "Inact" (in other words, disabled) in each routing table of any number of mutually connected switch devices, a state is assumed in which logical connection via the first physical path connecting the switch ports to each other is impossible (that is, a state with logical disconnection). Furthermore, by changing each status value from "Inact" to "Act" (that is, enabled) when a failure occurs in the second physical path, a state is assumed in which logical connection via the first physical path is possible. As a result, the storage system can continue operation, without interruption, even when a failure occurs in the first physical path. Therefore, reliability is improved.

The explanation below will be conducted with reference to the appended drawings. In the below-described storage system of a large-scale configuration, the number of downstream ports provided in one controller will be taken as two and the number of storage device units will be taken as three to facilitate the explanation. Furthermore, the explanation below will be mainly focused on items different from those of the first embodiment, and the explanation of common points with the first embodiment will be omitted or simplified.

Figure 17:
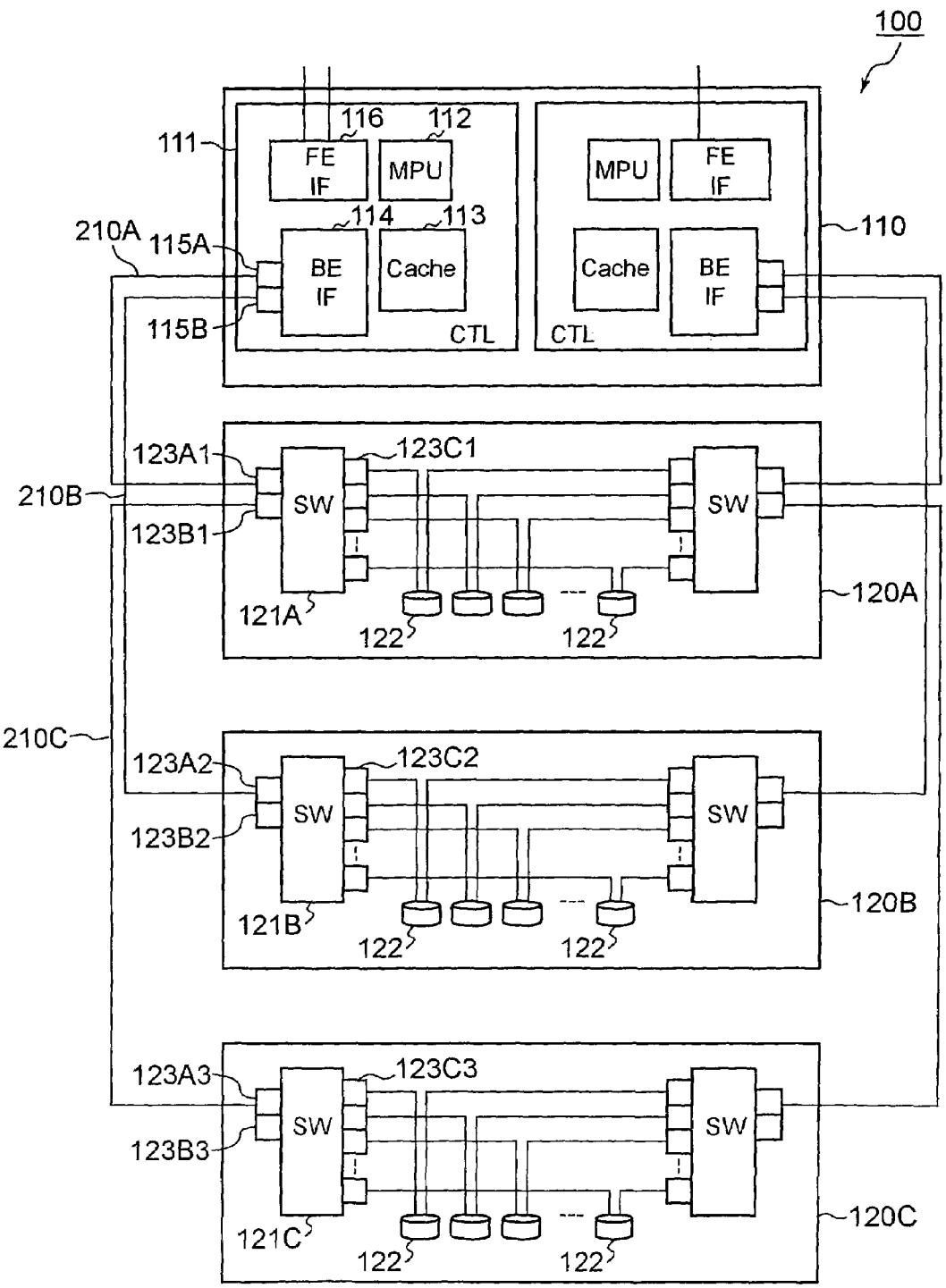
FIG. 17 shows a configuration example of a storage system of a large-scale configuration where a free port has appeared in the second embodiment of the present invention.
Figure 18:
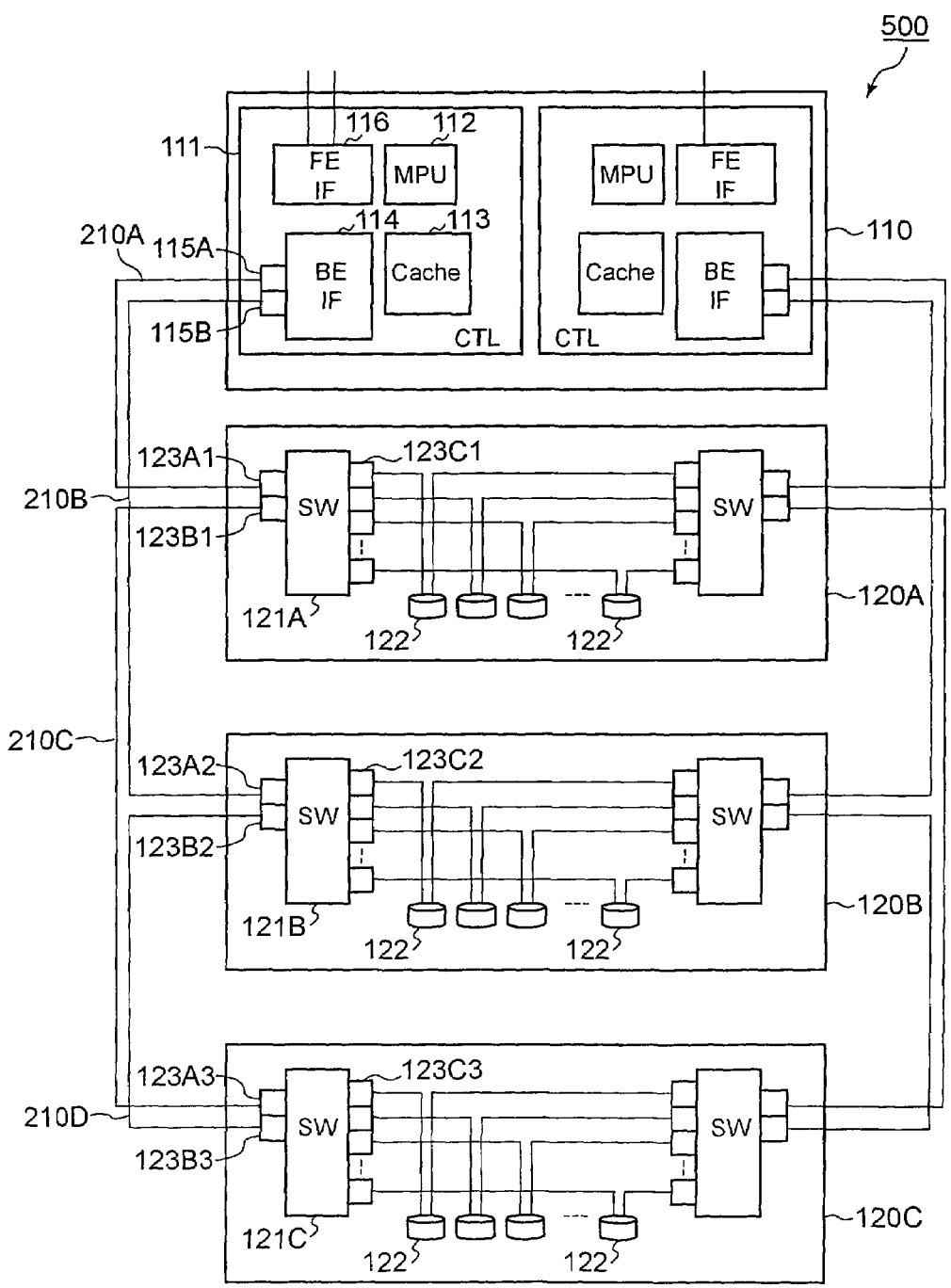
FIG. 18 shows a storage system of a large-scale configuration that is configured to employ effectively the free port.

FIG. 17 shows a configuration example of a storage system of a large-scale configuration where a free port has appeared in the second embodiment of the present invention. FIG. 18 shows a storage system of a large-scale configuration in which the free port is effectively used.

As shown in FIG. 17, when the controller 111 is on the upstreammost side and the controller 111 and three storage device units 120A, 120B, and 120C are connected in a cascade manner so that the downstream ports 115 do not become free ports, two (first and second) cascade routes appear in one access path from among the duplicated access paths.

The first cascade route is composed of a downstream port 115A of the controller 111, a physical path 210A, a switch port 123A1 of a switch device 121A of an expanded housing 120A, a switch port 123B1 of the switch device 121A, a physical path 210C, and a switch port 123A3 of a switch device 121C of an expanded housing 120C.

The second cascade path is composed of a downstream port 115B of the controller 111, a physical path 210B, and a switch port 123A2 of a switch device 121B of the expanded housing 120B.

Therefore, in one storage device unit 120B located on the downstreammost side of the cascade connection, the switch port 123B2 becomes a first free port, and in the other storage device unit 120C located on the downstream most side, the switch port 123B3 becomes a second free port.

Accordingly, in the second embodiment, as shown in FIG. 18, the switch port 123B2, which is the first free port, and the switch port 123B3, which is the second free port, are connected by a physical path 210D. As a result, the end of the first cascade route is physically connected to the end of the second cascade route and, therefore, they are physically connected in a loop-like fashion. As a result, both downstream ports 115A, 115B can provide access from the controller 111 to the same storage device (target device).

In the second embodiment, a physical loop-like connection is realized, but logical disconnection can logically form two cascade routes. This can be realized via the configuration of routing tables 303 of mutually connected switch devices 121. The configurations of routing tables of switch devices 121A, 121B, 121C will be explained below.

FIG. 19 shows a configuration example of a SW Routing Table 301A of the switch device 121A.

In this table 301A, "Lower" (a value meaning connection to a device of a lower level) is set as a connection type value and "SW" (a value meaning connection to another switch device) is set as a device type value with respect to the PHY ID "1" corresponding to the switch port 123B1. Furthermore, a value that means NULL is recorded as a device address value with respect to the PHY ID "1". This is because, the device type value is "SW", and the device is not a SAS target device even with SAS initiator devices.

Furthermore, in the second embodiment, because zoning based on a path group is not performed, the path group ID may not be recorded. As the case where the path group ID is recorded, for example, a path group ID (for example, PG_A) meaning the location in the first cascade route may be recorded.

FIG. 20 shows a configuration example of the SW Routing Table 301B of the switch device 121B. FIG. 21 shows a configuration example of the SW Routing Table 301C of the switch device 121C.

Logical connection via the physical path 210D is taken as an impossible state. Thus, in the SW Routing Table 301B, the status value corresponding to the switch port 123B2 (PHY ID "1") is taken as "Inact". Likewise, in the SW Routing Table 301C, the status value corresponding to the switch port 123B3 (PHY ID "1") is taken as "Inact".

The realization of a large-scale configuration shown by way of an example in FIG. 18 makes it possible to expand the expansion housings 120B, 120C in the small-scale configuration shown in FIG. 2. Conversely, reducing the expansion housings 120B, 120C makes it possible to obtain the small-scale configuration shown in FIG. 2. Configuration modification from the small-scale configuration to the large-scale configuration will be selected and successively explained below as a representative example.

First, the management terminal 150 sets the status values corresponding to the ports that are affected by the configuration modification to "Inact". More specifically, in the small-scale configuration of FIG. 2, such ports are 115B, 123B (123B1).

A physical path (cable) is then reconnected. As a result, the small-scale configuration of FIG. 2 is converted into the large-scale configuration of FIG. 18.

Finally, the status value of each port is set. More specifically, for example, the management terminal 150 sets to "Act" the status values of the ports 115B and 123B, which were set to "Inact". Furthermore, the management terminal 150 sets status values respectively corresponding to the switch ports 123B2 and 123B3 to "Inact" to disconnect logically the loop created by connecting the switch ports 123B2 and 123B3 with the physical path 210D.

In the above-described expansion, for example, all the status values corresponding to each of all the PHY ID may be set by default to "Act" in the SW Routing Tables 301B, 301C in each expansion housing 120B, 120C.

In a storage system 500 of a large-scale configuration shown in FIG. 18, a state is assumed in which logical connection of the controller 111 and storage device 122 via the physical path 210D is impossible (in other words, they are logically disconnected), but when a failure occurs in other physical paths 210A, 210B or 210C, a state is assumed in which logical connection via the physical path 210D is possible.

Figure 22:
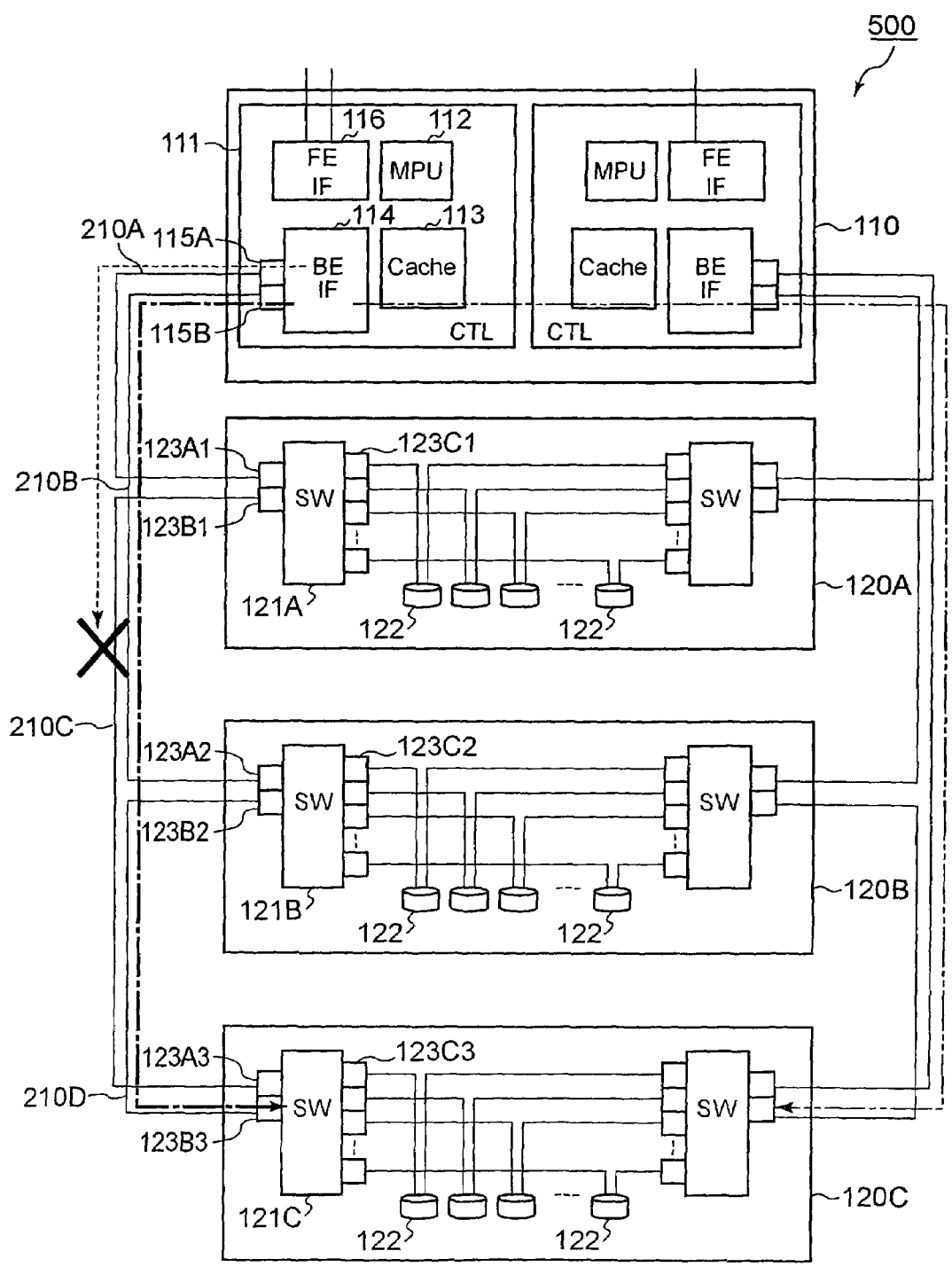
FIG. 22 illustrates the occurrence of a failure in a physical path in the storage system of a large-scale configuration shown in FIG. 18.

More specifically, for example, as shown in FIG. 22, when a failure occurs in the physical path 210C, this failure can be detected by the controller 111. This can be done, for example, by the controller 111 extracting a predetermined inquiry signal from each downstream port 115A, 115B and specifying a failure from the return value corresponding thereto. If a failure occurs in the physical path 210C, logical connection of the controller 111 to the storage device 122 via the physical path 210C becomes impossible as shown by a dotted line arrow. In this case, for example, as shown in FIG. 24, the status value corresponding to the switch port 123A (PHY ID "0") to which the physical path 210C is connected on the SW Routing Tables 301C is changed by the controller 111 from "Act" to "Inact", as shown by a bold line frame.

The controller 111 then changes the status value corresponding to PHY ID "1" from "Inact" to "Act", as shown by the bold line frames in FIG. 23 and FIG. 24, in the above-described SW Routing Tables 301B and 301C. In other words, the state in which the logical connection via the physical path 210D is impossible is changed into the state in which such connection is possible. As a result, as shown by a dot-dash line in FIG. 22, the controller 111 can now be logically connected via the physical path 210D so that logical connection to the storage device 122 is performed via the physical path 210C. As a result, the storage system 500 with a large-scale configuration can operate continuously without interruption and reliability is, therefore increased.

Instead of changing the configuration of the routing table so as to enable logical connection via the physical path 210D, the logical connection via the physical path 210C may be made so as to access the storage device 122 via another access path, as shown by a two-dot-dash line in FIG. 22. Whether to change the configuration of the routing table or to employ a connection via another access path may be determined, for example, based on the policy that was set in advance.

Furthermore, in the above-described example, the problem associated with failure occurrence was resolved by changing the status value, but a connection type value or device type value can be set instead of changing the status value.

Furthermore, for example, the management terminal 150 may read various Routing Tables 303, 301A, 301B, 301C from the first information holding unit 118 and/or second information holding unit 128 (not shown in the figure) of the expansion housings 120A, 120B, 120C and may display the Routing Tables 303, 301A, 301B, 301C on a display device (not shown in the figure).

Figure 25:
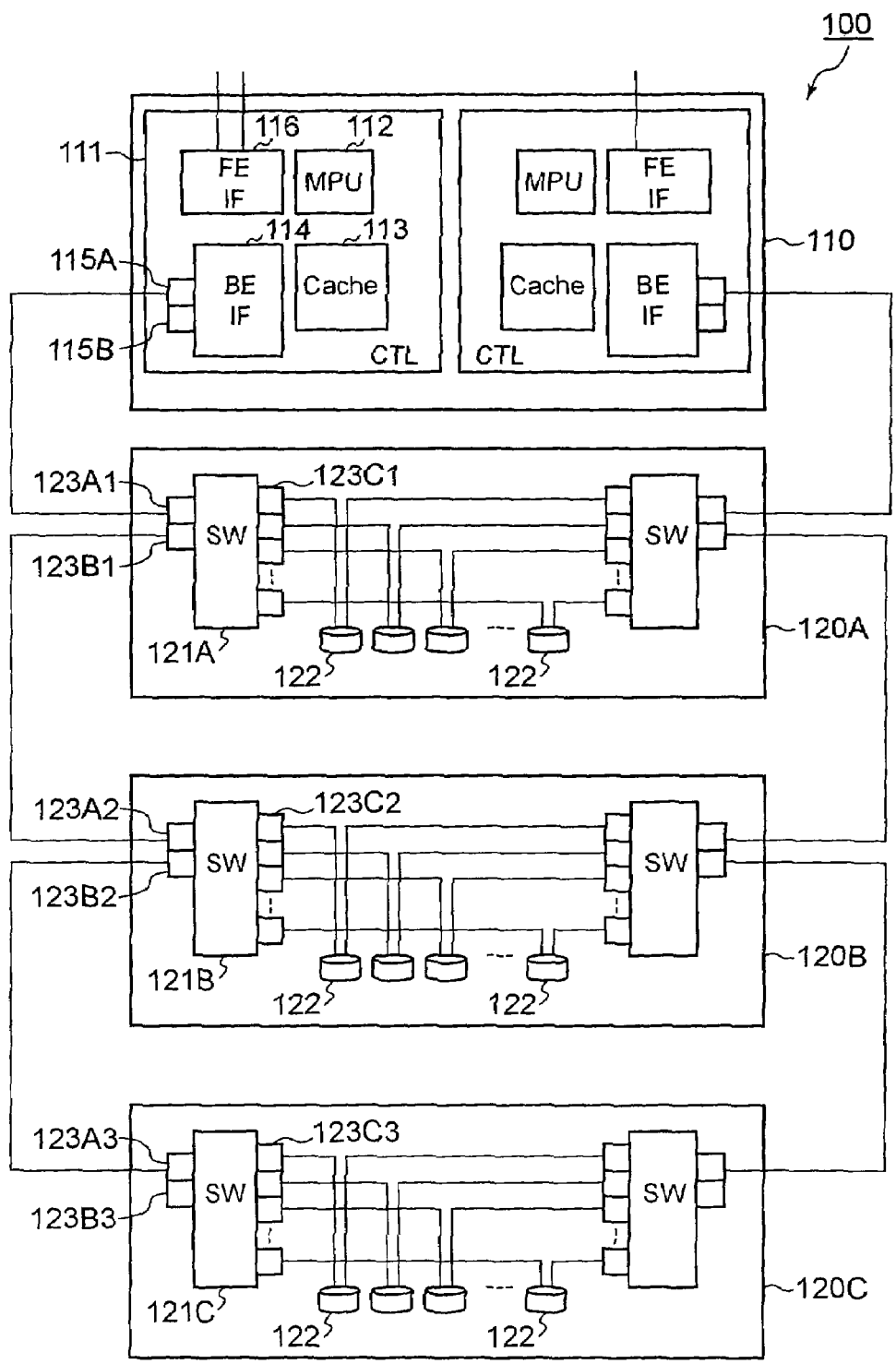
FIG. 25 shows an example of a free port appearing in a modification example of the storage system of a large-scale configuration.
Figure 26:
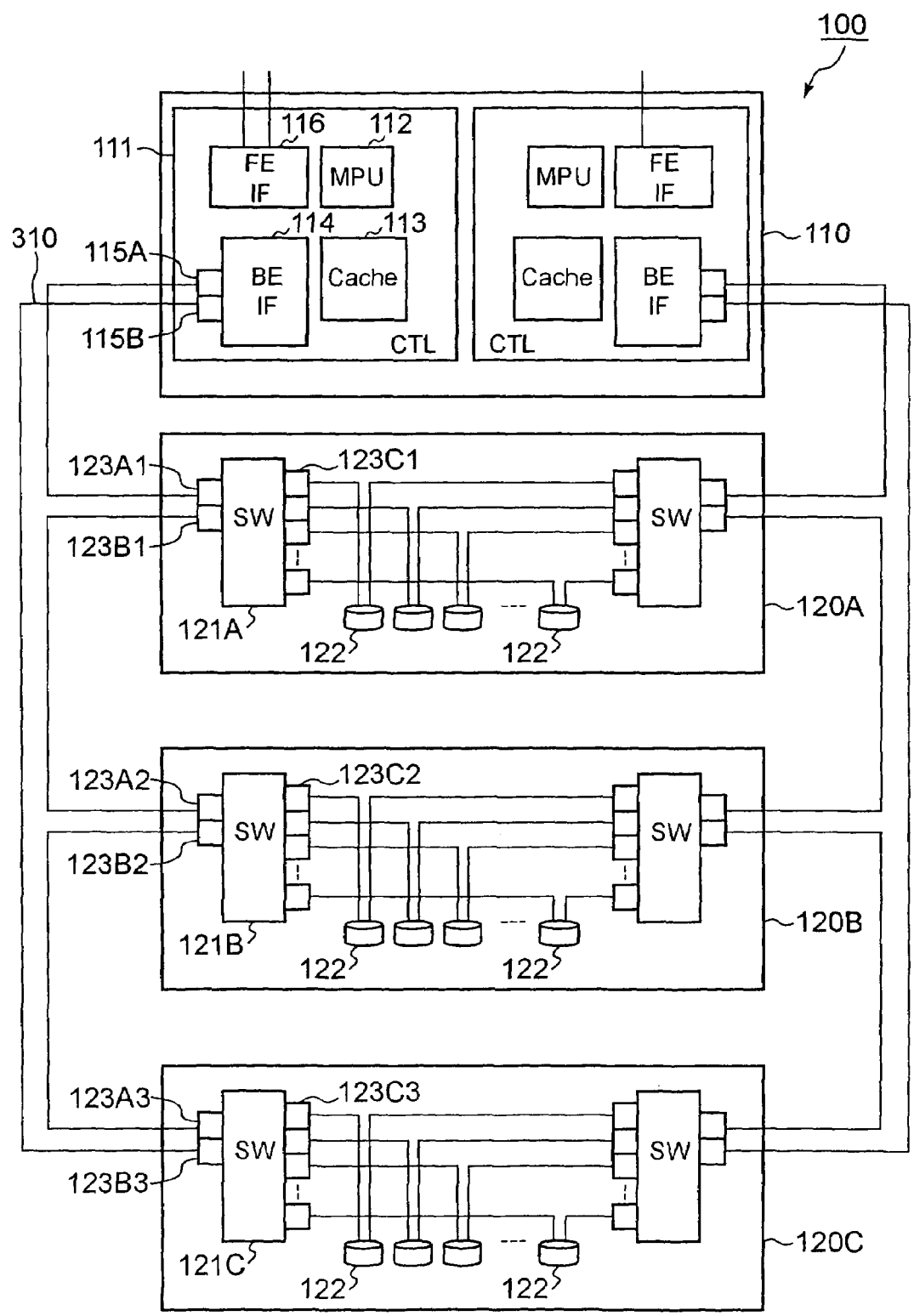
FIG. 26 shows an example of effectively using a free port in a modification example of the storage system of a large-scale configuration.

The preferred mode for carrying out the present invention and several embodiments thereof were explained above, but they merely serve to explain the present invention, and the scope of the present invention should not be construed as being limited to those preferred modes and embodiments. The present invention can be implemented in a variety of other modes. For example, when creating a modification example of a storage system of a large-scale configuration, for example, as shown in FIG. 25, the downstream port 115B of the controller 111 and the switch port 123B3 of the expanded housing 120C can become free ports. In such case, as shown by way of an example in FIG. 26, the downstream port 115B and switch port 123B3 may be connected by a physical path 310, whereby a certain portion that physically becomes a loop may be logically disconnected.

What is claimed is:

1. A storage system for receiving an I/O request transmitted from an upper-level device, comprising:
at least one storage device unit each of which includes a switch device and a plurality of storage devices; and
a controller for receiving and processing the I/O request from the upper-level device, said controller having a cache memory, a processor, an upstream communication port located on an upper-level side and connected to said upper-level device and a plurality of downstream communication ports located on a lower-level side and connected to the storage devices via said switch device with Serial Attached SCSI (SAS) protocols,
wherein said switch device has a plurality of switch communication ports, each of said plurality of storage devices in each said storage device unit and each of the downstream communication ports of said controller is connected to said switch device via a different one of the switch communication ports, said switch device and said controller are connected via at least two physical paths linking between the downstream communication ports and said switch communication ports,
wherein the storage device unit are logically divided into path groups, a first path group, included in said path groups, corresponding to a first downstream communication port, includes a first plurality of storage devices, included in said plurality of storage devices, first switch communication ports each of which is connected to one of the first plurality of storage devices or the first downstream communication port, a second path group, included in said path groups, corresponding to a second downstream communication port, includes a second plurality of storage devices, included in said plurality of storage devices, second switch communication ports each of which is connected to one of the second plurality of storage devices or the second downstream communication port,
wherein, in response to an I/O request received from said upper-level device, the processor in the controller specifies a storage device which has to be accessed according to the I/O request,
wherein, if the specified storage device is included in said first path group, the processor transmits data related to the I/O request to the specified storage device via the first downstream communication port and at least one of the first switch communication ports connecting the specified storage device which has to be accessed according to the I/O request,
wherein, if the specified storage device is included in said second path group, the processor transmits data related to the I/O request to the specified storage device via the second downstream communication port and at least one of the second switch communication ports connecting the specified storage device which has to be accessed according to the I/O request,
stores, in response to the I/O request received from said upper-level device, a data in said cache memory and sends the data stored in said cache memory to at least one of said plurality of storage devices via one of the plurality of downstream communication ports, which is related to the path group including one of the switch communication ports connecting to said at least one storage device to which the data will be sent,
wherein the path groups are associated with the physical paths on a one-to-one basis, and each of the physical paths corresponds to one or more RAID groups according to a corresponding relationship, each of the RAID groups being configured on plural ones of the storage devices, and
wherein said controller calculates a data transmission amount for each of the RAID groups, and equalizes transfer sizes of the path groups by changing the corresponding relationship between the RAID groups and the path groups associated with the physical path.

2. The storage system according to claim 1, wherein, when a failure occurs in one of the physical paths, said controller cancels an association between said one physical path and communication ports of a corresponding path group, and associates said one physical path with communication ports of a different path group having no failure.

3. The storage system according to claim 1, wherein, when a transfer data size of a RAID group is larger than thresholds of existing RAID groups, two of existing path groups corresponding to the existing RAID group are associated with the new RAID group to transfer data.

4. A method for a storage system receiving an I/O request transmitted from an upper-level device, comprising:
   providing the storage system including at least one storage device unit each of which includes a switch device and a plurality of storage devices, and a controller for receiving and processing the I/O request from the upper-level device, said controller having a cache memory, a processor, an upstream communication port located on an upper-level side and connected to said upper-level device and a plurality of downstream communication ports located on a lower-level side and coupled to the storage devices via said switch device with Serial Attached (SAS) protocol, said switch device has a plurality of switch communication ports;
   connecting each of said plurality of storage devices in each said storage device unit and each of the downstream communication ports of said controller to said switch device via a different one of the switch communication ports;
   connecting said switch device and said controller via at least two physical paths linking between the downstream communication ports and said switch communication ports;
   logically dividing the storage device unit into path groups, including, a first path group, included in said path groups, corresponding to a first downstream communication port, which includes a first plurality of storage devices, included in said plurality of storage devices, first switch communication ports each of which is connected to one of the first plurality of storage devices or the first downstream communication port, and a second path group, included in said path groups, corresponding to a second downstream communication port, which includes a second plurality of storage devices, included in said plurality of storage devices, second switch communication ports each of which is connected to one of the second plurality of storage devices or the second downstream communication port;
   specifying a storage device which has to be accessed in response to an I/O request received from said upper-level device;
   transmitting, if the specified storage device is included in said first path group, data related to the I/O request to the specified storage device via the first downstream communication port and at least one of the first switch communication ports connecting the specified storage device which has to be accessed according to the I/O request;
   transmitting, if the specified storage device is included in said second path group, data related to the I/O request to the specified storage device via the second downstream communication port and at least one of the second switch communication ports connecting the specified storage device which has to be accessed according to the I/O request, storing, in response to the I/O request received from said upper-level device, a data in said cache memory and sending the data stored in said cache memory to at least one of said plurality of storage devices via one of the plurality of downstream communication ports, which is related to the path group including one of the switch communication ports connecting to said at least one storage device to which the data will be sent;
   associating the path groups with the physical paths on a one-to-one basis;
   corresponding each of the physical paths to one or more RAID groups according to a corresponding relationship, each of the RAID groups being configured on plural ones of the storage devices; and
   calculating a data transmission amount for each of the RAID groups; and equalizing transfer sizes of the path groups by changing the corresponding relationship between the RAID groups and the path groups associated with the physical path.

5. The method according to claim 4, further comprising: when a failure occurs in one of the physical paths, cancelling an association between said one physical path and communication ports of a corresponding path group, and associating said one physical path with communication ports of a different path group having no failure.

6. The method according to claim 4, further comprising: when a transfer data size of a RAID group is larger than thresholds of existing RAID groups, associating two of existing path groups corresponding to the existing RAID group with the new RAID group thereby transferring data.

* * * * *